(12) United States Patent
Shanai et al.

(10) Patent No.: US 12,535,392 B2
(45) Date of Patent: Jan. 27, 2026

(54) RESIN COMPOSITION PHYSICAL PROPERTY ESTIMATION DEVICE AND RESIN COMPOSITION PHYSICAL PROPERTY ESTIMATION METHOD

(71) Applicant: Proterial, Ltd., Tokyo (JP)

(72) Inventors: Daisuke Shanai, Tokyo (JP); Tomonori Watanabe, Tokyo (JP); Takahiro Suzuki, Tokyo (JP)

(73) Assignee: Proterial, Ltd., Tokyo (JP)

( * ) Notice: Subject to any disclaimer, the term of this patent is extended or adjusted under 35 U.S.C. 154(b) by 352 days.

(21) Appl. No.: 18/239,426

(22) Filed: Aug. 29, 2023

(65) Prior Publication Data

US 2024/0077393 A1 Mar. 7, 2024

(30) Foreign Application Priority Data

Sep. 2, 2022 (JP) ................................. 2022-139907

(51) Int. Cl.
*G01N 3/06* (2006.01)
(52) U.S. Cl.
CPC ..... *G01N 3/066* (2013.01); *G01N 2203/0017* (2013.01); *G01N 2203/0218* (2013.01); *G01N 2203/067* (2013.01)
(58) Field of Classification Search
CPC ............. G01N 3/066; G01N 2203/067; G01N 2203/0218; G01N 2203/0017
See application file for complete search history.

(56) References Cited

U.S. PATENT DOCUMENTS

| | | | | |
|---|---|---|---|---|
| 2023/0252319 | A1* | 8/2023 | Fujishima | G16C 20/30 706/46 |
| 2024/0077393 | A1 | 3/2024 | Shanai et al. | |
| 2024/0354473 | A1* | 10/2024 | Ageba | G06N 3/09 |

FOREIGN PATENT DOCUMENTS

| | | |
|---|---|---|
| JP | 2019-082790 A | 5/2019 |
| JP | 2024-35451 A | 3/2024 |

(Continued)

OTHER PUBLICATIONS

Japanese Office Action, dated Sep. 3, 2024 in Japanese Application No. 2023-215340 and English Translation thereof.

*Primary Examiner* — Stephanie E Bloss
*Assistant Examiner* — Diana Hancock
(74) *Attorney, Agent, or Firm* — McGinn IP Law Group, PLLC

(57) ABSTRACT

A physical property estimation device for a resin composition, which estimates a physical property of a resin composition that is manufactured by using a base polymer, a flame retardant, a flame retardant auxiliary, and other materials. The physical property estimation device is provided with a regression model building processing unit that learns by machine learning a relationship between explanatory variable data and physical property data including physical property data as an estimation target, and builds a regression model that shows a correlation between the explanatory variable data and the physical property data, and a physical property estimation processing unit that estimates the physical property of an estimation target by using the regression model. The explanatory variable data includes compound amount data of the base polymer, the flame retardant, and the flame retardant auxiliary respectively, when a physical property to be estimated by the physical property estimation processing unit is either initial elongation or initial tensile strength of the estimation target.

7 Claims, 8 Drawing Sheets

(56) References Cited

FOREIGN PATENT DOCUMENTS

| KR | 20230147381 A | * | 10/2023 | ............... | G06N 3/09 |
| WO | WO-2021220775 A1 | * | 11/2021 | ............. | G06F 30/27 |

* cited by examiner

FIG. 2

| ID | BASE POLYMER | | | | | ... | FILLER (FLAME RETARDANT /FLAME RETARDANT AUXILIARY) | | | | | ... | OTHER MATERIALS | | | | | ... | IRRADIANCE LEVEL | PHYSICAL PROPERTY | | ... |
|---|---|---|---|---|---|---|---|---|---|---|---|---|---|---|---|---|---|---|---|---|---|---|
| | POLYMER A | POLYMER B | POLYMER C | POLYMER D | POLYMER E | ... | FILLER A | FILLER B | FILLER C | FILLER D | FILLER E | ... | ANTIOXIDANT | COPPER INHIBITOR | LUBRICANT | COLORANT | CROSSLINKING AUXILIARY | ... | | INITIAL STATE TENSILE STRENGTH | ELONGATION | ... |
| 0100a | 40 | 40 | 20 | | | ... | 200 | | | | | ... | 3 | 0.5 | 2 | 2 | 4 | ... | 100 | 180 | 10.5 | ... |
| 0100b | 30 | 30 | | 40 | | ... | | | 200 | | | ... | 3 | | 2 | 2 | 4 | ... | 70 | 160 | 12 | ... |
| ... | | | | | | | | | | | | | | | | | | | | | | |

REGRESSION MODEL BUILDING PROCESS

PHYSICAL PROPERTY ESTIMATION PROCESS

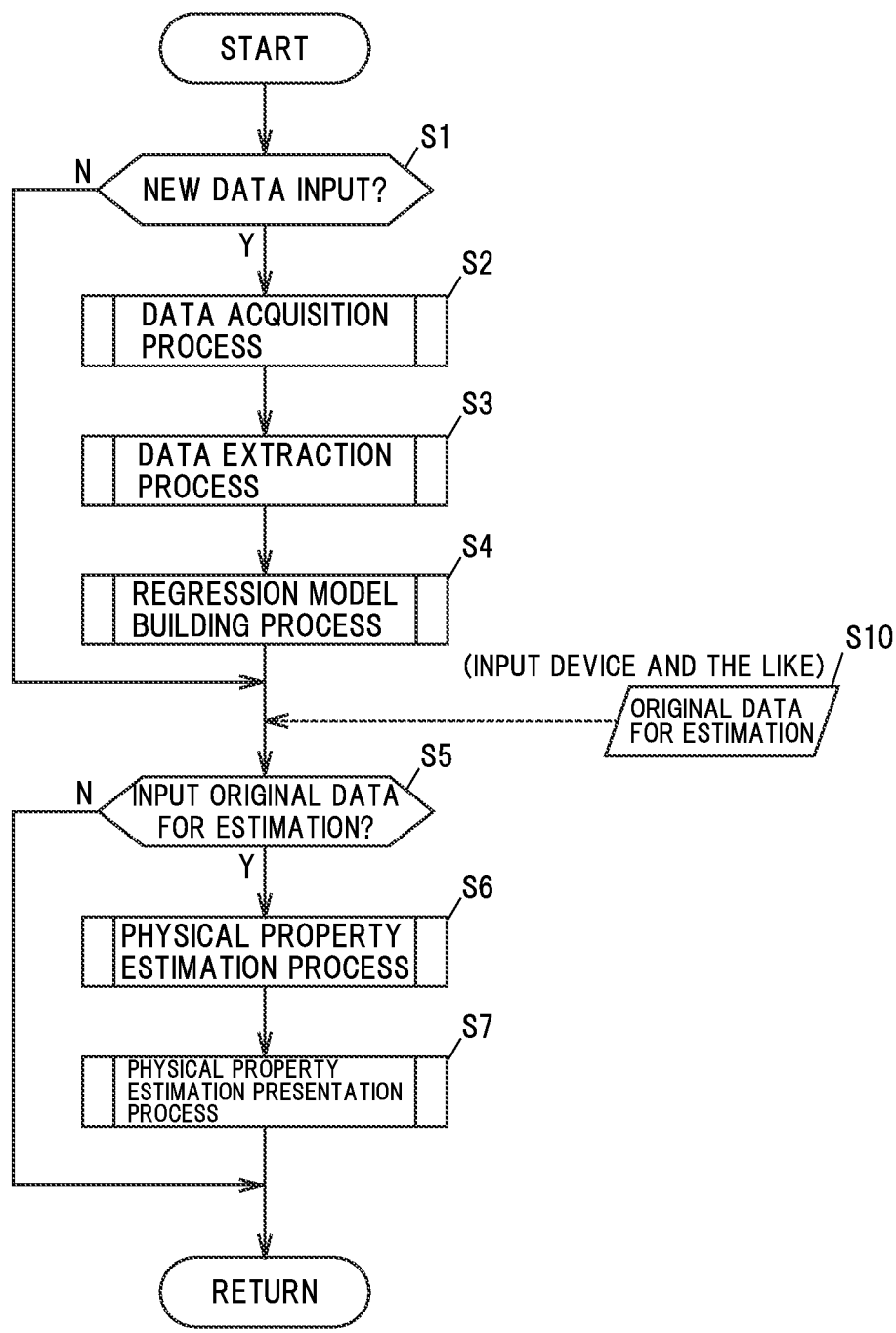

RESIN COMPOSITION PHYSICAL PROPERTY ESTIMATION DEVICE AND RESIN COMPOSITION PHYSICAL PROPERTY ESTIMATION METHOD

CROSS-REFERENCE TO RELATED APPLICATIONS

The present patent application claims the priority of Japanese patent application No. 2022-139907 filed on Sep. 2, 2022, and the entire contents thereof are hereby incorporated by reference.

TECHNICAL FIELD

The present invention relates to a resin composition physical property estimation device and a resin composition physical property estimation method.

BACKGROUND OF THE INVENTION

In recent years, methods and devices for material designing by using machine learning results are proposed. (See, e.g., Patent Literature 1.) By using such methods or devices, e.g., physical properties can be estimated corresponding to a compound amount or other data of raw materials, which allows to shorten a period for the research and development of the materials and reduce the cost for the research and development of the materials.

CITATION LIST

Patent Literature Patent Literature 1: JP2019-82790A

SUMMARY OF THE INVENTION

Incidentally, to design a resin composition as a coating material for electric wires, it is often desired to estimate elongation or tensile strength with high accuracy as a physical property. In addition to a base polymer, many materials such as flame retardant, flame retardant auxiliary (i.e., flame retardant promotor), antioxidant, copper inhibitor, lubricant, colorant, crosslinking auxiliary (i.e., crosslinking aid), and the like are used to make a resin composition as the coating material for electric wires. When estimating the physical properties of such a resin composition, there were cases where the estimation accuracy of physical properties was not satisfactorily obtained even when using the compound amounts of all the materials.

The object of the present invention is to provide a physical property estimation device and an estimation method for a resin composition that allow estimation of elongation or tensile strength of a resin composition with high accuracy.

For solving the above problems, one aspect of the present invention provides a physical property estimation device for a resin composition, which estimates a physical property of a resin composition that is manufactured by using a base polymer, a flame retardant, a flame retardant auxiliary, and other materials, comprising:
  a regression model building processing unit that learns by machine learning a relationship between explanatory variable data and physical property data including physical property data as an estimation target, and builds a regression model that shows a correlation between the explanatory variable data and the physical property data; and
  a physical property estimation processing unit that estimates the physical property of an estimation target by using the regression model,
  wherein the explanatory variable data includes compound amount data of the base polymer, the flame retardant, and the flame retardant auxiliary respectively, when a physical property to be estimated by the physical property estimation processing unit is either initial elongation or initial tensile strength of the estimation target.

Also, for solving the above problems, another aspect of the present invention provides a physical property estimation method for a resin composition, to estimate a physical property of a resin composition that is manufactured by using a base polymer, a flame retardant, a flame retardant auxiliary, and other materials, the method comprising:
  a regression model building step of learning a relationship between explanatory variable data and physical property data including physical property data of an estimation target by machine learning, and building a regression model that shows a correlation between the explanatory variable data and the physical property data; and
  a physical property estimation step of estimating the physical property of the estimation target by using the regression model,
  wherein the explanatory variable data includes compound amount data of each of the base polymer, the flame retardant, and the flame retardant auxiliary when the physical property to be estimated in the physical property estimation step is either initial elongation or initial tensile strength of the estimation target.

Advantageous Effect of the Invention

According to the present invention, it is possible to provide a physical property estimation device and an estimation method for a resin composition that allow estimation of elongation or tensile strength of a resin composition with high accuracy.

BRIEF DESCRIPTION OF DRAWINGS

FIG. 2 is a table showing an example of data for learning.

FIG. 5 is a flowchart showing a physical property estimation method for a resin composition according to another embodiment of the present invention.

MODE FOR CARRYING OUT THE INVENTION

Embodiments

Figure 1:
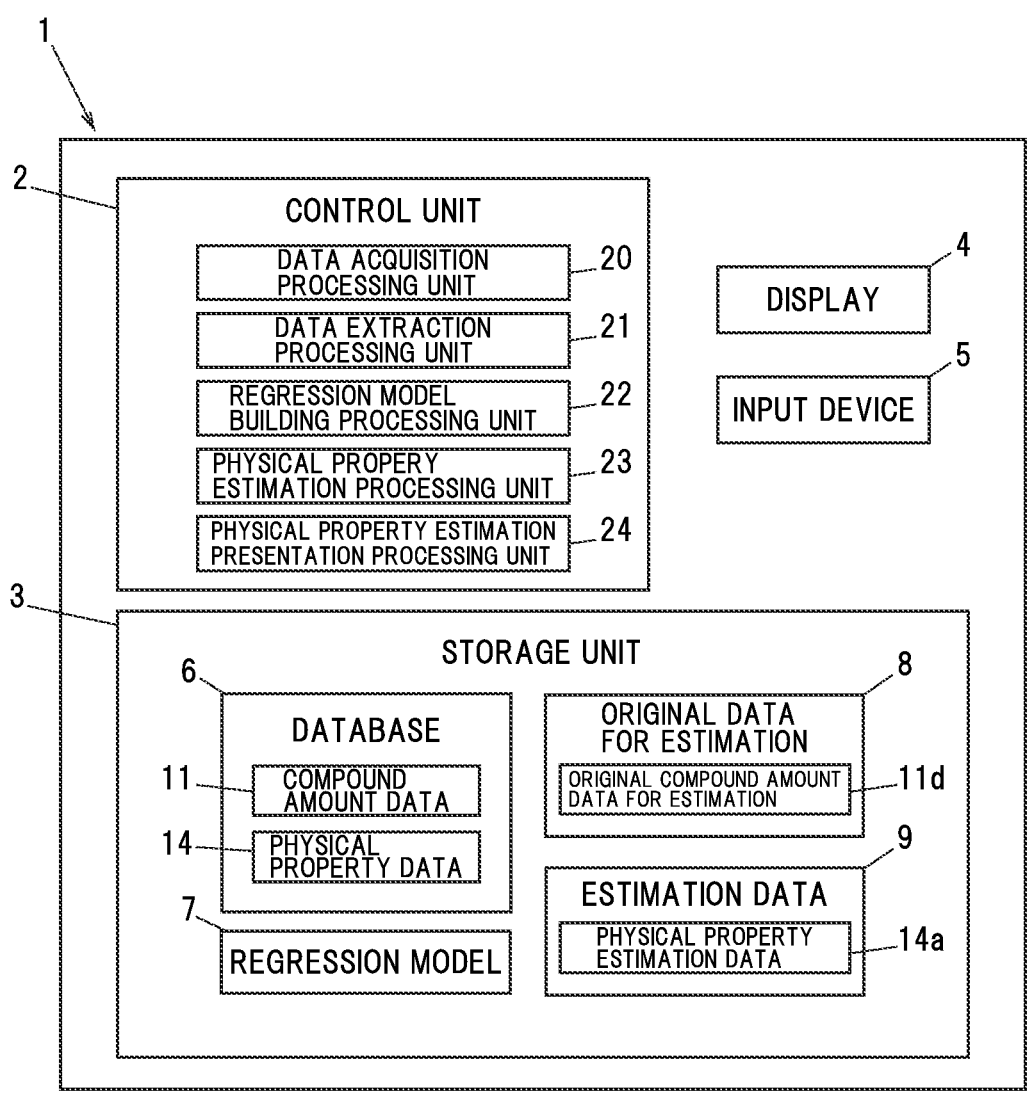
FIG. 1 is a schematic diagram showing a physical property estimation device for a resin composition according to an embodiment of the present invention.

The embodiments of the present invention will be explained below according to the attached drawings.
Schematic Configuration of Physical Property Estimation Device 1 for a Resin Composition FIG. 1 is a schematic configuration diagram showing a physical property estimation device 1 for a resin composition (hereinafter, referred to as "physical property estimation device 1") according to an embodiment of the present invention. The physical property estimation device 1 is a device to estimate a physical property of a resin composition that is manufactured using a base polymer, flame retardant, flame retardant auxiliary, and other materials.

Here, a resin composition of which physical property is an estimation target, is a coating material for electric wires, and is a halogen-free resin composition crosslinked by electron beam irradiation. Also, in the present embodiment, a physical property as an estimation target is either initial elongation or initial tensile strength of a resin composition as an estimation target. Additionally, "initial" here means a state where the resin composition concerned is not deteriorated.

As shown in FIG. 1, the physical property estimation device 1 includes a control unit 2, a storage unit 3, a display 4, and an input device 5. In the present embodiment, the physical property estimation device 1 is configured by personal computers.

The control unit 2 is configured by appropriately composing elements such as a CPU, an arithmetic element, a memory, interfaces, software, a storage device, and the like. In the present embodiment, the control unit 2 includes a data acquisition processing unit 20, a data extraction processing unit 21, a regression model building processing unit 22, a physical property estimation processing unit 23, and a physical property estimation presentation processing unit (i.e., estimated physical property presentation processing unit) 24. The details of each unit are explained later.

The storage unit 3 is configured by a memory and a predetermined storage area of a storage device. The display 4 is, e.g., a liquid crystal display and the like, and the input device 5 is, e.g., a keyboard or a mouse or the like. The display 4 can be configured by a touch panel in such a manner that the display 4 can be used as the input device 5. Also, the display 4 and the input device 5 can be configured separately from the physical property estimation device 1, but can be interconnected (i.e., intercommunicative) with the physical property estimation device 1 through wireless communication and the like. In this case, the display 4 or the input device 5 can be configured by mobile devices such as a tablet or a smartphone.
Database 6

Next, the database 6 will be explained. The database 6 is a database where the entire data including data to be used for machine learning is integrated. FIG. 2 shows an example of the database 6. FIG. 2 just shows a concept of the database 6, and it is not the actual experimental data. As shown in FIG. 2, the database 6 includes at least, compound amount data 11, irradiation amount (i.e., irradiation dose) data 13, and physical property data 14. In the example here, the database 6 includes ID data (ID) 12 to identify resin compositions. The database 6 can include data other than that, e.g., data that show manufacturing conditions of a resin composition (what we call "process data"), or data that show tissue conditions of a resin composition (what we call "tissue data").

The compound amount data 11 includes compound amount data of each material that composes a resin composition. In more concrete terms, the compound amount data 11 includes base polymer compound amount data 11a that includes compound amount data of a base polymer, filler compound amount data 11b that includes compound amount data of fillers (what we call "flame retardant" and "flame retardant auxiliary"), and other materials compound amount data 11c that includes compound amount data of other materials. In the present embodiment, other materials include antioxidant, copper inhibitor, lubricant, crosslinking auxiliary, and colorant. Additionally, materials such as crosslinking agent, stabilizer, and the like can be included in other materials.

In the present embodiment, the database 6 has the irradiation amount data 13 that includes electron beam irradiation amount data for crosslinking, because a physical property estimation target is a resin composition crosslinked by electron beam irradiation. The irradiation amount data 13 is data that shows manufacturing conditions, so we can say it is a part of what we call "process data." Also, when a target is a resin composition that is not crosslinked by electron beam irradiation, the irradiation amount data 13 can be omitted.

In the present embodiment, a physical property as an estimation target is elongation or tensile strength, thus, physical property data 14 includes at least elongation or tensile strength of a resin composition as an estimation target. Also, the physical property data 14 can include degradation characteristics of elongation and tensile strength under specific environment in addition to initial elongation and initial tensile strength. In the example here, elongation and tensile strength under heat aging are shown as degradation characteristics, but degradation characteristics under various environments such as oil resistance, fuel resistance, cold resistance, and the like can be included.
Data Acquisition Processing Unit 20

Figure 6A:
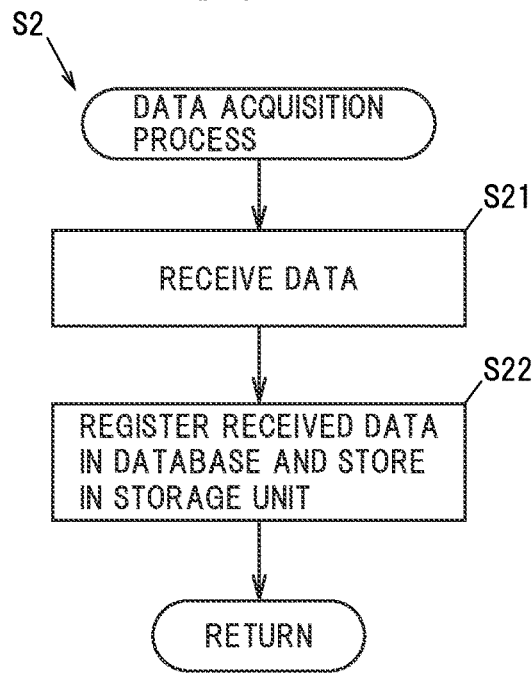
FIG. 6A is a flowchart showing a data acquisition process.

The data acquisition processing unit 20 executes a data acquisition process by registering data input from exterior in the database 6 and storing the data in the storage unit 3 (See FIG. 6A). Data can be input by the input device 5, by communication from an external device (wired communication, wireless communication, or communication via network, and the like), or via a media such as a USB memory. Additionally, the data acquisition processing unit 20 can be configured to acquire data proactively, e.g., by sending a data request signal to an external device.
Data Extraction Processing Unit 21

Figure 3:
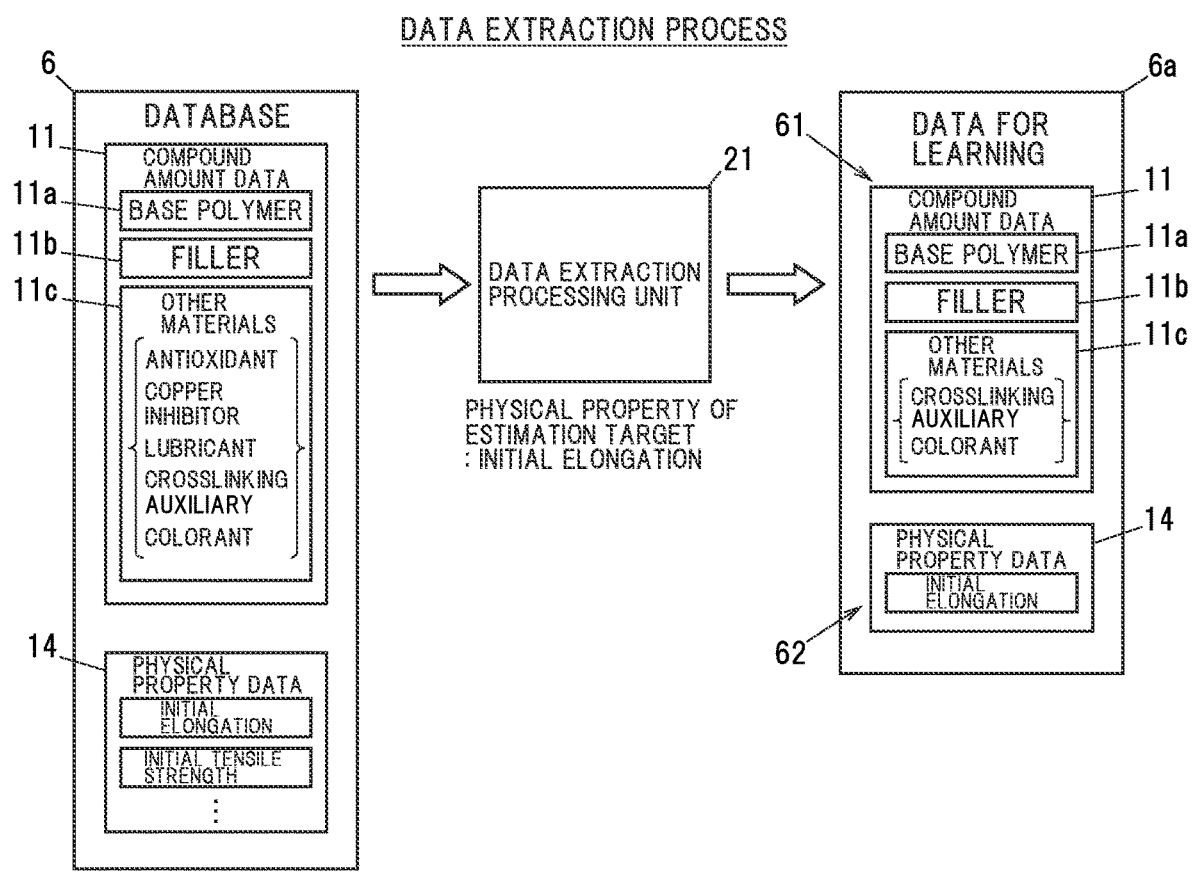
FIG. 3 is a schematic diagram explaining a data extraction process.
Figure 6B:
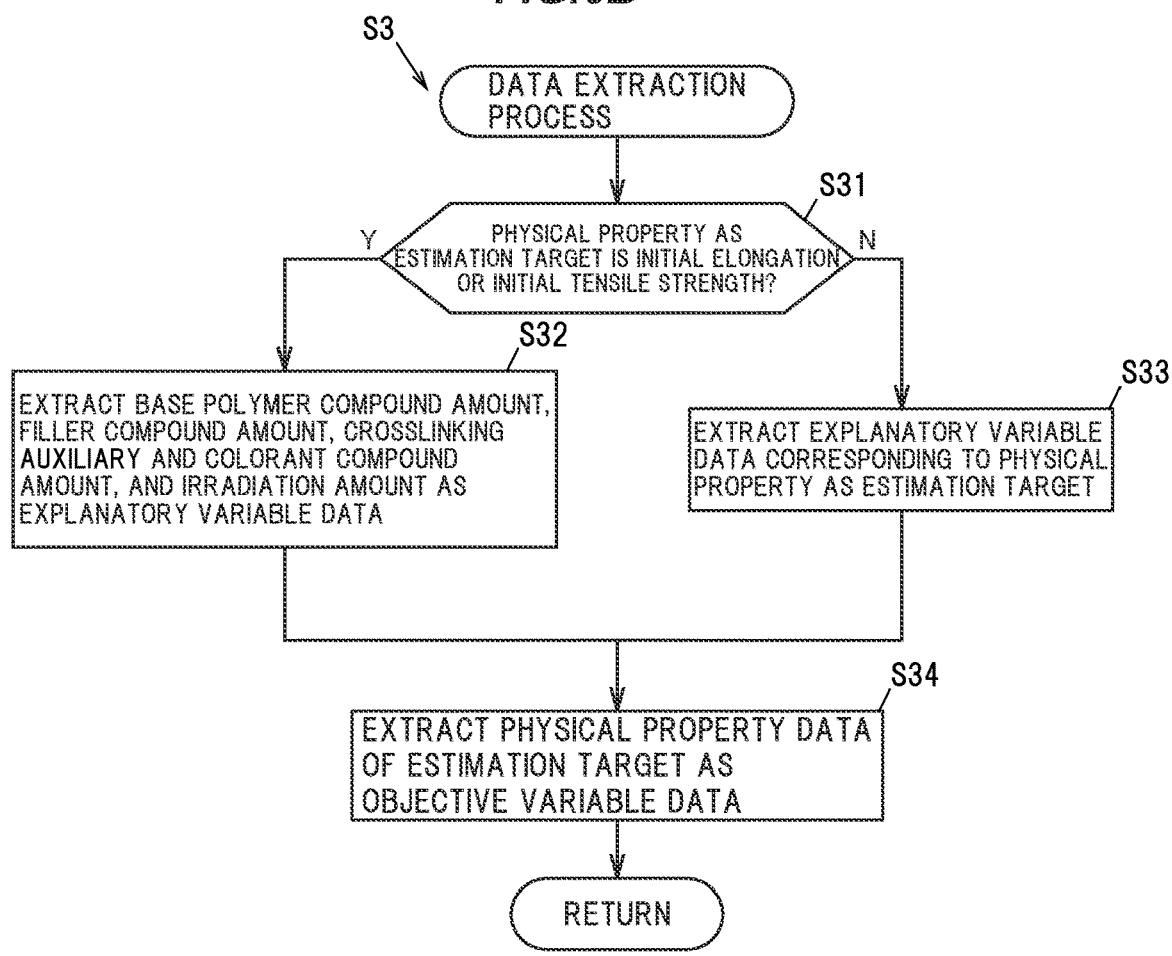
FIG. 6B is a flowchart showing a data extraction process.

The data extraction processing unit 21 executes a data extraction process corresponding to a physical property as an estimation target (physical property to be estimated by the physical property estimation processing unit 23) by extracting explanatory variable data 61 to be used as explanatory variable(s) at machine learning, and objective variable data 62 to be used as objective variable(s) at machine learning, from the database 6 including various data, and generate data for learning 6a (See FIG. 3, FIG. 6B).

When a physical property to be estimated by the physical property estimation processing unit 23 is initial elongation or initial tensile strength as an estimation target, the data extraction processing unit 21 extracts data in such a manner that the explanatory variable data 61 includes, at least, each compound amount data of base polymer, flame retardant, and flame retardant auxiliary (in other words, the base polymer compound amount data 11a and the filler compound amount data 11b). In the present embodiment, when a physical property to be estimated by the physical property estimation processing unit 23 is initial elongation or initial tensile strength as an estimation target, the data extraction processing unit 21 extracts data in such a manner that the explanatory variable data 61 does not include each compound amount data of antioxidant, copper inhibitor, and lubricant.

It is because the estimation accuracy can be improved by using the compound amount data of base polymer, flame retardant, and flame retardant auxiliary, each of which has a relatively high compound amount, as explanatory variables. On the contrary, each of antioxidant, copper inhibitor, and lubricant has a relatively small compound amount, and at the same time, has little fluctuation in compound amount. They have a small influence on initial elongation or initial tensile strength, so if their compound amount data is included as the explanatory variables, some noise is generated at machine learning, which may reduce the estimation accuracy. Thus, when a physical property as an estimation target to be estimated by the physical property estimation processing unit 23 is initial elongation or initial tensile strength, the estimation accuracy can be improved by excluding respective compound amount data of antioxidant. copper inhibitor, and lubricant from the explanatory variables.

In the present embodiment, a halogen-free resin composition that is crosslinked by electron beam irradiation is an estimation target, so the data extraction processing unit 21 is configured to extract data in such a manner that the explanatory variable data 61 includes the irradiation amount data 13. Moreover, a halogen-free resin composition that is crosslinked by electron beam irradiation includes a crosslinking auxiliary as other materials. The crosslinking auxiliary may influence elongation or tensile strength, therefore, the data extraction processing unit 21 extracts data in such a manner that the explanatory variable data 61 includes the compound amount data of crosslinking auxiliary.

However, it is not mandatory to include the irradiation amount data 13 and the compound amount data of the crosslinking auxiliary in the explanatory variable data 61. For example, even when a halogen-free resin composition crosslinked by electron beam irradiation is used as an estimation target, the irradiation amount data 13 can be removed from the explanatory variable data 61 if the electron beam irradiation amount is always constant (or irradiation amount has little fluctuation). Also, when the compound amount of crosslinking auxiliary to be added is subtle, or the fluctuation in the compound amount of crosslinking auxiliary is very little, the compound amount data of crosslinking auxiliary can be removed from the explanatory variable data 61.

If a resin composition that is not crosslinked by electron beam irradiation is an estimation target, naturally, the irradiation amount data 13 or the compound amount data of crosslinking auxiliary can be omitted. If, for example, a resin composition crosslinked by chemical crosslinking is an estimation target, the compound amount data of crosslinking agent can be included in the explanatory variable data 61, and other data (process data or texture data and the like) can be added to the explanatory variable data 61 as needed.

In the present embodiment, the compound amount data of colorant is included in the explanatory variable data 61, but the compound amount data of colorant can be omitted. Also, as described above, when a halogen-free resin composition that is crosslinked by electron beam irradiation is an estimation target, the compound amount data of crosslinking auxiliary can be removed from the explanatory variable data 61. In other words, the explanatory variable data 61 should include at least the compound amount data of base polymer, flame retardant, and flame retardant auxiliary (the base polymer compound amount data 11*a* and the filler compound amount data 11*b*), but can exclude the compound amount data of other materials (the compound amount data 11*c* of other materials).

As shown in FIG. 3, for example, when a physical property to be estimated by the physical property estimation processing unit 23 is "initial elongation" of an estimation target, the data extraction processing unit 21 extracts data in such a manner that the explanatory variable data 61 includes the base polymer compound amount data 11*a*, the filler compound amount data 11*b*, the compound amount data of crosslinking auxiliary and colorant from the compound amount data 11*c* of other materials, and the irradiation amount data 13, but exclude the compound amount data of antioxidant, copper inhibitor, and lubricant from the compound amount data 11*c* of other materials. Then it extracts only initial elongation data as an estimation target from the physical property data 14 as the objective variable data 62.

Also, the data extraction processing unit 21 can include the compound amount data of at least one of antioxidant, copper inhibitor, and lubricant in the explanatory variable data 61, when a physical property as an estimation target is not initial elongation nor initial tensile strength. For example, when a physical property as an estimation target is a degradation characteristic of elongation or tensile strength of a resin composition under a specific environment (elongation and tensile strength after degradation, or a decrease rate of elongation and tensile strength between the initial state and after the degradation), the influence of other materials can be bigger. In that case, as the explanatory variable data 61, in addition to the compound amount data of base polymer, flame retardant, and flame retardant auxiliary, the compound amount data of at least one of antioxidant, copper inhibitor, and lubricant can be included.

Regression Model Building Processing Unit 22

The regression model building processing unit 22 executes machine learning by using the data for learning 6*a* (the explanatory variable data 61 and the objective variable data 62) extracted by the data extraction processing unit 21, and executes a regression model building process (See FIG. 7A) in order to build a regression model 7.

Figure 4A:
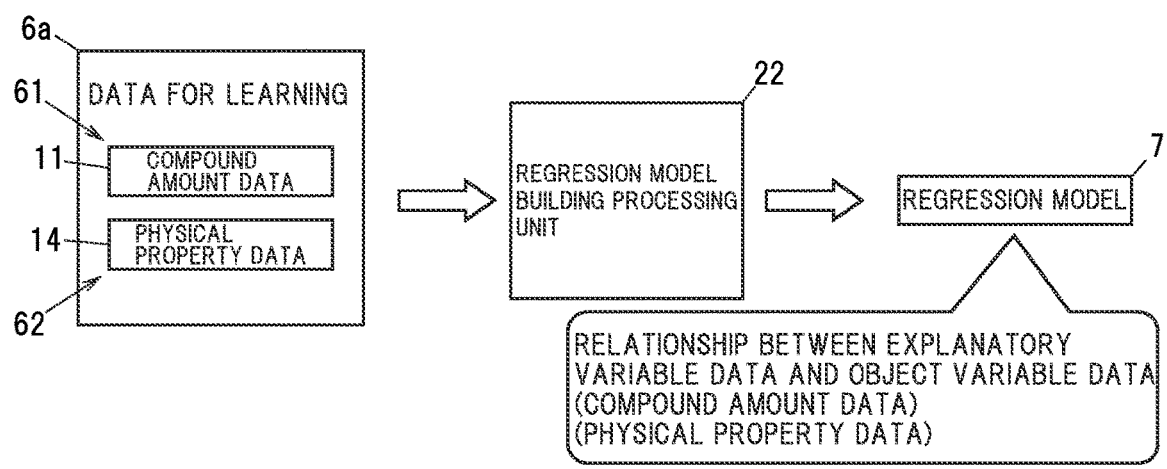
FIG. 4A is a schematic diagram explaining a regression model building process.

As shown in FIG. 4A, the explanatory variable data 61 and the objective variable data 62 extracted by the data extraction processing unit 21 are input to the regression model building processing unit 22 (the same as "data for learning 6*a*" on the right side of FIG. 3).

The regression model building processing unit 22 is configured with software such as learning algorithms in order to learn by itself the correlation between input parameters of the explanatory variable data 61 and respective parameters of the objective variable data 62 by machine learning. The learning algorithms are not specified here, but publicly known learning algorithms can be used, e.g., so-called "deep learning" using a neural network with three layers or more, or the like. What the regression model building processing unit 22 learns is equivalent to a model structure expressing the correlation between the explanatory variable data 61 and the objective variable data 62.

The regression model building processing unit 22 builds the regression model 7 that shows correlation between the base polymer compound amount data 11*a*, the filler compound amount data 11*b*, the compound amount data of crosslinking auxiliary and colorant in the compound amount data 11*c* of other materials, and the irradiation amount data 13, input as the explanatory variable data 61, and the physical property data 14 (initial elongation or tensile strength) input as the objective variable data 62, when a physical property as an estimation target is initial elongation or initial tensile strength.

In more concrete terms, with the input data for learning 6a as a base, the regression model building processing unit 22 repeatedly executes learning according to data collection including the explanatory variable data 61 and the objective variable data 62, and understands their correlation automatically. Additionally, the data correlation is in an unknown state at the beginning of learning, but in the course of learning, the relation of the objective variable data 62 against the explanatory variable data 61 is gradually understood. By using a learned model, the regression model 7 that has been obtained as a result of the learning, the relation of the objective variable data 62 against the explanatory variable data 61 becomes understandable.

The regression model building processing unit 22 stores the built regression model 7 in the storage unit 3. In the present embodiment, the regression model building processing unit 22 updates the regression model 7 every time the data for learning 6a is updated. However, updating is not limited to this way, when executing a physical property estimation process described below, e.g., updating of the data for learning 6a can be learned collectively, and the regression model 7 can be updated.

Physical Property Estimation Processing Unit 23

The physical property estimation processing unit 23 executes the physical property estimation process (See FIG. 7B) by the regression model 7, in order to estimate the physical property data 14 corresponding to an estimation base, original data for estimation 8. Hereinafter, used as the original data for estimation 8, the compound amount data 11 is called the compound amount data for estimation 11d. The physical property estimation processing unit 23 stores the estimated physical property data 14 as the estimation data 9 in the storage unit 3. Hereinafter, the estimated physical property data 14 is called the physical property estimation data 14a.

Figure 4B:
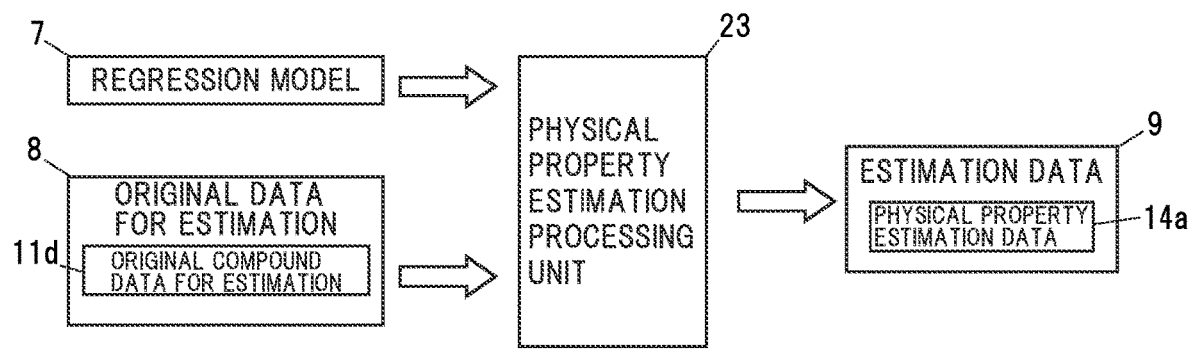
FIG. 4B is a schematic diagram explaining a physical property estimation process.

As shown in FIG. 4B, the regression model 7 and the original data for estimation 8 are input to the physical property estimation processing unit 23 in the physical property estimation process. Although it is not shown in a drawing, in the present embodiment, the irradiation amount data 13 is used in addition to the compound amount data for estimation 11d as the original data for estimation 8. The physical property estimation processing unit 23 obtains the physical property data 14 corresponding to the original data for estimation 8 by using the regression model 7, and stores the obtained physical property data 14 (physical property estimation data 14a) in the storage unit 3 as estimation data 9. The estimation data 9 obtained here shows physical property of a resin composition to be estimated (for example, initial elongation or tensile strength) when a resin composition is manufactured with the materials and the irradiation amount of the original data for estimation 8.

Physical Property Estimation Presentation Processing Unit 24

The physical property estimation presentation processing unit 24 executes the physical property estimation presentation process to present the estimation data 9. In the physical property estimation presentation process, e.g., the estimation data 9 is displayed in the display 4. Also, in the physical property estimation presentation process, data other than the estimation data 9, e.g., items used as the explanatory variable data 61 can be configured to be presented as well.

Estimation Method for a Physical Property of a Resin Composition

Main routine: FIG. 5 is a flowchart showing a physical property estimation method for a resin composition according to the embodiment of the present invention. In FIG. 5, the arrows in solid line show the flow of operations, and an arrow in dashed line shows input and output of signals or data.

As shown in FIG. 5, the control unit 2 judges if new data is input in step S1 in the physical property estimation method for a resin composition according to the embodiment of the present invention. If judged NO (N) in step S1, the procedure moves on to step S5. If judged YES (Y) in step S1, the procedure moves on to step S2 and executes data acquisition process.

In the data acquisition process in step S2, as shown in FIG. 6A, the data acquisition processing unit 20 acquires data (the compound amount data 11, the irradiation amount data 13, and the physical property data 14) (step S21), then registers the acquired data in the database 6 and stores in the storage unit 3 (step S22). After that, the procedure returns.

After executing the data acquisition process step S2, data extraction process is executed in step S3. In the data extraction process in step S3, as shown in FIG. 6B, the data acquisition processing unit 20 judges if a physical property as an estimation target is initial elongation or initial tensile strength (step S31). Also, a physical property as an estimation target can be specified, e.g., by the input device 5. If judged YES (Y) in step S31, in step S32, the data acquisition processing unit 20 extracts the base polymer compound amount data 11a, the filler compound amount data 11b, the compound amount of crosslinking auxiliary and colorant from the compound amount data 11c of other materials, and the irradiation amount data 13, from the database 6 as the explanatory variable data 61. At that time, the compound amount data of antioxidant, copper inhibitor, and lubricant in the compound amount data of other materials 11c is excluded. After that, the procedure moves on to step S34.

If judged NO (N) in step S31, the data acquisition processing unit 20 extracts the explanatory variable data 61 from the database 6 corresponding to a physical property as an estimation target in step S33. For example, when a physical property as an estimation target is a degradation characteristic of elongation or tensile strength, the unit can extract data in such a manner that the compound amount of at least one of antioxidant, copper inhibitor, and lubricant from the compound amount data 11c of other materials is included as the explanatory variable data 61. Then the procedure moves on to step S34. In step S34, the data acquisition processing unit 20 extracts the physical property data 14 of an estimation target as the objective variable data 62 from the database 6. It is not shown in the drawing, but the extracted explanatory variable data 61 and the objective variable data 62 can be linked in order to create the data for learning 6a, and can be stored in the storage unit 3. After that, the procedure returns and moves on to step S4 in FIG. 5.

Figure 7A:
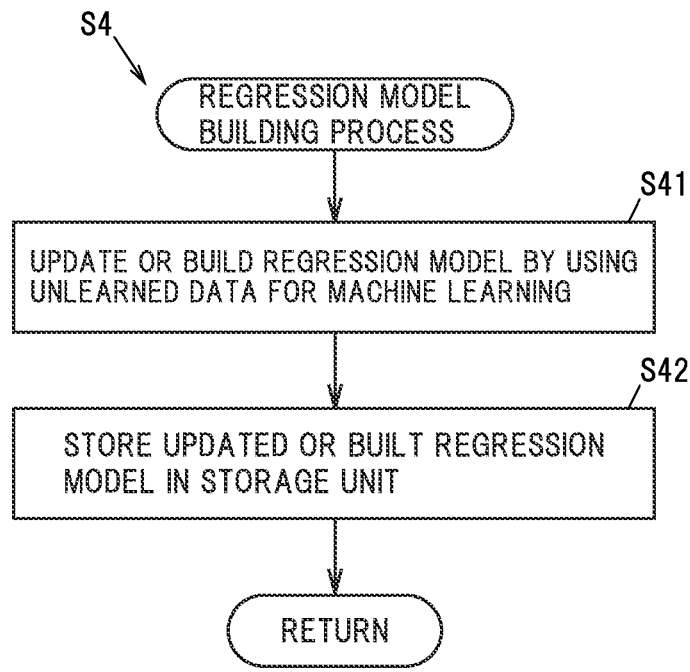
FIG. 7A is a flowchart showing a regression model building process.

In step S4, the regression model building process is executed. In the regression model building process, as shown in FIG. 7A, first, the regression model building processing unit 22 updates the regression model 7 by using the data for learning 6a yet to be learned for machine learning (the explanatory variable data 61 and the objective variable data 62 that are extracted in step S3) in step S41. Also, if the regression model 7 is not built yet, the regression model 7 is newly created in step S41. After that, the updated (or newly created) regression model 7 is stored in the storage unit 3 in step S42, and the procedure returns.

When estimating a physical property of a resin composition, input the original data for estimation 8 through the input device 5 or the like (step S10). Additionally, input data that will be the original data for estimation 8 (the compound amount data 11 and the irradiation amount data 13) in the physical property estimation device 1 for a resin composition in advance, the data used as the original data for estimation 8 can be configured to be selectable by the input device 5.

In step S5, the control unit 2 judges if the original data for estimation 8 is input or not. If judged NO in step S5, the procedure returns (returns to step S1). If judged YES in step S5, the procedure moves on to step S6.

Figure 7B:
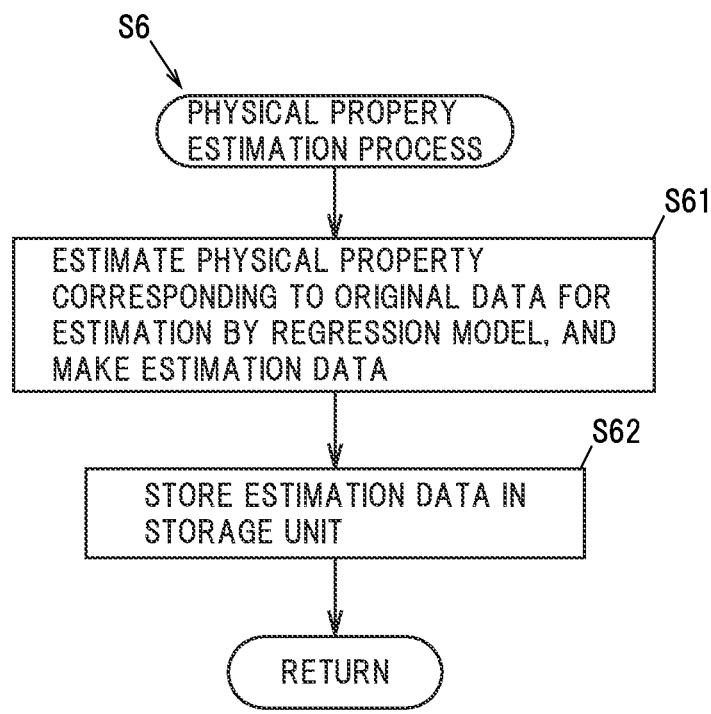
FIG. 7B is a flowchart showing a physical property estimation process.

In step S6, the physical property estimation process is executed. In the physical property estimation process, as shown in FIG. 7B, first, in step S61, the physical property estimation processing unit 23 estimates the physical property data 14 corresponding to the original data for estimation 8 (physical property estimation data 14a) by using the regression model 7, and make it as the estimation data 9. Next, in step S62, it stores the acquired estimation data 9 in the storage unit 3. After that, the procedure returns and moves on to step S7 in FIG. 5.

In step S7, the physical property estimation presentation process is executed. In the physical property estimation presentation process, e.g., the estimation data 9 that has been estimated in step S6 is presented on the display 4. After that, the procedure returns (returns to step S1).

Figure 8A:
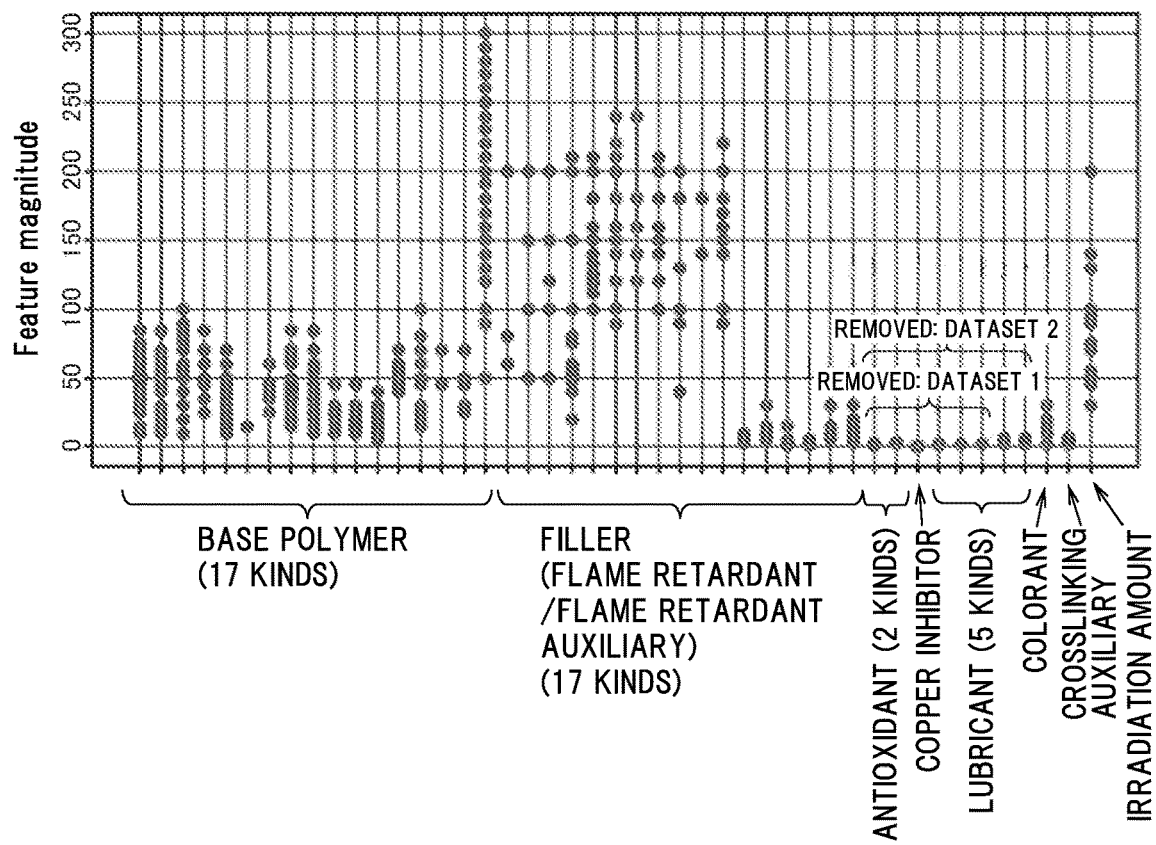
FIG. 8A is a diagram showing the data used as data for learning in the embodiment of the present invention.

Explanatory Variable Study Suitable for Estimating Initial Elongation or Initial Tensile Strength We have studied explanatory variables suitable for estimating initial elongation or initial tensile strength. In our study, as shown in FIG. 8A, we used data including data of 17 kinds of base polymers, 17 kinds of fillers (flame retardant and flame retardant auxiliary), two kinds of antioxidants, one kind of copper inhibitor, five kinds of lubricants, one kind of colorant, one kind of crosslinking auxiliary, and irradiation amount as the data for learning 6a, and we studied the change in the estimation accuracy of the regression model 7 by cross-validation, when the explanatory variable data 61 to be used is removed. In the study, we allocated 70% of all data to the data for learning 6a, and the rest 30% to experimental data. After building up the regression model 7 by using the allocated data for learning 6a, we estimated the experimental data by using the regression model 7 that has been built, and figured out a mean absolute percentage error (MAPE). We repeated such a data allocation, building the regression model 7, and the evaluation 30 times, and figured out the average value of mean absolute percentage error (MAPE). Also, we can say that the smaller the mean absolute percentage error is, the better regression model 7 with higher estimation accuracy we have built. Initial elongation and initial tensile strength were physical properties as estimation targets here.

We have studied three types of Examples respectively: Example 1 where all the compound amount data is used as the explanatory variable data 61, Example 2 where a part of antioxidant, copper inhibitor, and lubricant data is removed from the explanatory variable data 61 (three kinds out of five), and Example 3 where all data of antioxidant, copper inhibitor, and lubricant is removed from the explanatory variable data 61. In FIG. 8A, the data removed from the explanatory variable data 61 in Example 2 is called "data set 1," and the data removed from the explanatory variable data 61 in Example 3 is called "data set 2." The average values of mean absolute percentage error obtained by the study are shown collectively in FIG. 8B.

Figure 8B:
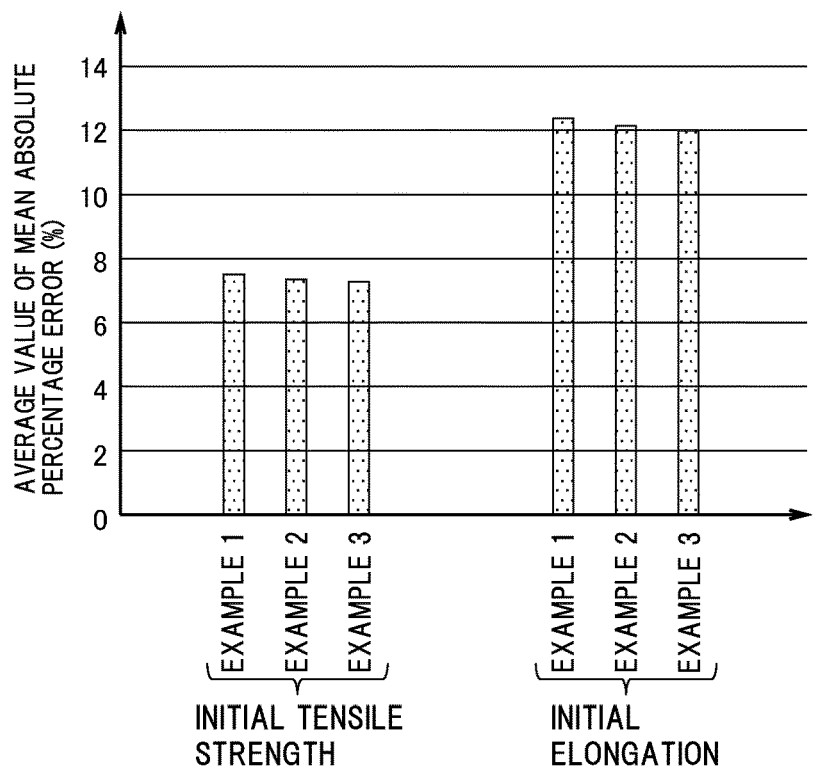
FIG. 8B is a diagram showing the average value of mean absolute error rate that was obtained by study.

As shown in FIG. 8B, Example 3 has the smallest mean absolute percentage error compared with Examples 1 and 2, which means that the regression model 7 with high estimation accuracy is obtained. We have confirmed from the results that the estimation accuracy can be improved by removing antioxidant and copper inhibitor from the explanatory variable data 61, and the estimation accuracy can be further improved by removing antioxidant, copper inhibitor, and lubricant from the explanatory variable data 61, when a physical property as an estimation target is initial elongation or initial tensile strength.

Advantageous Effect of the Embodiment

As explained above, the physical property estimation device 1 according to the present embodiment comprises the regression model building processing unit 22 that learns by machine learning the relation of the explanatory variable data 61 and the physical property data 14, and builds the regression model 7 which shows the correlation between the explanatory variable data 61 and the physical property data 14, and the physical property estimation processing unit 23 that estimates a physical property as an estimation target by using the regression model 7, wherein the explanatory variable data 61 includes the compound amount data of base polymer, flame retardant, and flame retardant auxiliary, when a physical property to be estimated by the physical property estimation processing unit 23 is initial elongation or initial tensile strength of an estimation target.

The estimation accuracy can be improved by using the compound amount data of base polymer, flame retardant, and flame retardant auxiliary that have relatively big compound amounts, as the explanatory variables. Moreover, by removing the compound amount data of antioxidant, copper inhibitor, and lubricant from the explanatory variable data 61, initial elongation or initial tensile strength can be estimated with higher accuracy.

Summary of the Embodiment

Next, technical ideas understood from the above embodiment, are described with reference to the reference numerals and the like used in the embodiment. However, each reference numeral in the following description does not limit the constituent elements in the scope of claims to the members and the like specifically shown in the embodiments.

According to the first feature, a physical property estimation device 1, which estimates a physical property of a resin composition that is manufactured by using a base polymer, a flame retardant, a flame retardant auxiliary, and other materials, includes a regression model building processing unit 22 that learns by machine learning a relationship between explanatory variable data 61 and physical property data 14 including physical property data of an estimation target, and builds a regression model 7 that shows a correlation between the explanatory variable data 61 and the physical property data 14, and a physical property estimation processing unit 23 that estimates the physical property of the estimation target by using the regression model 7, wherein the explanatory variable data 61 includes compound amount data of the base polymer, the flame retardant, and the flame retardant auxiliary, when the physical property to be estimated by the physical property estimation processing unit 23 is either initial elongation or initial tensile strength of the estimation target.

According to the second feature, in the physical property estimation device for a resin composition as described in the first feature, the other materials include at least one of an antioxidant and a copper inhibitor, and the explanatory variable data 61 does not include compound amount data of each of the antioxidant and the copper inhibitor, when the physical property to be estimated by the physical property estimation processing unit 23 is either initial elongation or initial tensile strength of the estimation target.

According to the third feature, in the physical property estimation device for a resin composition 1 as described in the first feature, the other materials include at least one of an antioxidant, a copper inhibitor, and a lubricant, wherein the explanatory variable data 61 does not include compound amount data of each of the antioxidant, the copper inhibitor, and the lubricant, and when the physical property to be estimated by the physical property estimation processing unit 23 is initial elongation or initial tensile strength of the estimation target.

According to the fourth feature, the physical property estimation device for a resin composition 1 as described in the third feature, further includes a database including the compound amount data 11 of at least the base polymer, the flame retardant, the flame retardant auxiliary, and the other materials, respectively, and the physical property data 14 that includes at least physical property of the estimation target, and data extraction processing unit 21 that extracts the explanatory variable data 61 from the database 6 corresponding to a physical property to be estimated by the physical property estimation processing unit 23, wherein the data extraction processing unit 21 extracts the explanatory variable data in such a manner that the compound amount data of at least the base polymer, the flame retardant, and the flame retardant auxiliary is included, and at the same time, the data of the antioxidant, the copper inhibitor, and the lubricant is excluded, when the physical property to be estimated by the physical property estimation processing unit 23 is initial elongation or initial tensile strength of the estimation target.

According to the fifth feature, in the physical property estimation device for a resin composition as described in the first feature, the resin composition as the estimation target is a halogen-free resin composition that is crosslinked by electron beam irradiation, and the explanatory variable data includes data of an electron beam irradiation amount for crosslinking.

According to the sixth feature, in the physical property estimation device for a resin composition 1 as described in the fifth feature, when the other materials include a crosslinking auxiliary, the explanatory variable data 61 includes compound amount data of the crosslinking auxiliary when the physical property to be estimated by the physical property estimation processing unit 23 is initial elongation or initial tensile strength of the estimation target.

According to the seventh feature, a physical property estimation method for a resin composition, which estimates a physical property of a resin composition that is manufactured by using a base polymer, a flame retardant, a flame retardant auxiliary, and other materials, including a regression model building step of learning a relationship between explanatory variable data 61 and physical property data 14 including physical property data of an estimation target by machine learning, and building a regression model 7 that shows a correlation between the explanatory variable data 61 and the physical property data 14, and a physical property estimation step of estimating the physical property of the estimation target by using the regression model 7, wherein the explanatory variable data 61 includes compound amount data of each of the base polymer, the flame retardant, and the flame retardant auxiliary, when the physical property to be estimated in the physical property estimation step is either initial elongation or initial tensile strength of the estimation target.

SUPPLEMENTARY NOTE

That is all for the description of an embodiments of the present invention, but the above embodiments do not limit the invention according to the scope of claims. It should be noted that not all combinations of features are essential to the means for solving problems of the invention. Additionally, this invention is not limited to the above embodiments, but various modifications can be made without departing from the scope and spirit of the invention.

The invention claimed is:

1. A physical property estimation device for a resin composition, which estimates a physical property of a resin composition that is manufactured by using a base polymer, a flame retardant, a flame retardant auxiliary, and other materials, comprising:
   a regression model building processing unit that learns by machine learning a relationship between explanatory variable data and physical property data including physical property data of an estimation target, and builds a regression model that shows a correlation between the explanatory variable data and the physical property data; and
   a physical property estimation processing unit that estimates the physical property of the estimation target by using the regression model,
   wherein the explanatory variable data includes compound amount data of the base polymer, the flame retardant, and the flame retardant auxiliary respectively, when a physical property to be estimated by the physical property estimation processing unit is either initial elongation or initial tensile strength of the estimation target.

2. The physical property estimation device for a resin composition, according to claim 1, wherein the other materials include at least one of an antioxidant and a copper inhibitor, wherein the explanatory variable data does not include compound amount data of each of the antioxidant and the copper inhibitor, when the physical property to be estimated by the physical property estimation processing unit is either the initial elongation or the initial tensile strength of the estimation target.

3. The physical property estimation device for a resin composition, according to claim 1, wherein the other materials include at least one of an antioxidant, a copper inhibitor, and a lubricant, wherein the explanatory variable data does not include compound amount data of each of the antioxidant, the copper inhibitor, and the lubricant, when the physical property to be estimated by the physical property estimation processing unit is either the initial elongation or the initial tensile strength of the estimation target.

4. The physical property estimation device for a resin composition, according to claim 3, further comprising:
   a database including the compound amount data of at least the base polymer, the flame retardant, the flame retardant auxiliary, and the other materials, respectively, and physical property data including at least physical property data of the estimation target; and
   a data extraction processing unit that extracts the explanatory variable data from the database corresponding to the physical property to be estimated by the physical property estimation processing unit, wherein the data extraction processing unit extracts the explanatory variable data in such a manner that the compound amount data of at least the base polymer, the flame retardant, and the flame retardant auxiliary is included, and at the same time, the data of the antioxidant, the copper inhibitor, and the lubricant is excluded, when the physical property to be estimated by the physical property estimation processing unit is either the initial elongation or the initial tensile strength of the estimation target.

5. The physical property estimation device for a resin composition, according to claim 1, wherein the resin composition as the estimation target is a halogen-free resin composition that is crosslinked by electron beam irradiation, and the explanatory variable data includes data of an electron beam irradiation amount for crosslinking.

6. The physical property estimation device for a resin composition, according to claim 5, wherein the other materials include a crosslinking auxiliary, and the explanatory variable data includes compound amount data of the crosslinking auxiliary when the physical property to be estimated by the physical property estimation processing unit is either the initial elongation or the initial tensile strength of the estimation target.

7. A physical property estimation method for a resin composition, to estimate a physical property of a resin composition that is manufactured by using a base polymer, a flame retardant, a flame retardant auxiliary, and other materials, the method comprising:

a regression model building step of learning a relationship between explanatory variable data and physical property data including physical property data of an estimation target by machine learning, and building a regression model that shows a correlation between the explanatory variable data and the physical property data; and a physical property estimation step of estimating the physical property of the estimation target by using the regression model, wherein the explanatory variable data includes compound amount data of each of the base polymer, the flame retardant, and the flame retardant auxiliary when the physical property to be estimated in the physical property estimation step is either initial elongation or initial tensile strength of the estimation target.

* * * * *